United States Patent
Li et al.

(10) Patent No.: US 10,785,226 B2
(45) Date of Patent: Sep. 22, 2020

(54) METHOD FOR CONTROLLING PERMISSION OF APPLICATION PROGRAM AND CONTROLLER

(71) Applicant: HUAWEI TECHNOLOGIES CO., LTD., Shenzhen, Guangdong (CN)

(72) Inventors: Jinming Li, Beijing (CN); Yan Chen, Hangzhou (CN); Chengchen Hu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 15/667,635

(22) Filed: Aug. 3, 2017

(65) Prior Publication Data
US 2017/0359350 A1    Dec. 14, 2017

Related U.S. Application Data

(63) Continuation of application No. PCT/CN2015/083522, filed on Jul. 8, 2015.

(30) Foreign Application Priority Data

Feb. 9, 2015 (CN) .......................... 2015 1 0064799

(51) Int. Cl.
*H04L 29/06* (2006.01)
*G06F 21/62* (2013.01)

(52) U.S. Cl.
CPC .......... *H04L 63/101* (2013.01); *G06F 21/62* (2013.01); *H04L 63/0227* (2013.01); *H04L 63/1441* (2013.01)

(58) Field of Classification Search
CPC .............. H04L 63/101; H04L 63/0227; H04L 63/1441

(Continued)

(56) References Cited

U.S. PATENT DOCUMENTS 7,818,780 B1   10/2010 Salmi et al.
9,455,955 B2 *  9/2016 Fetik .................... G06F 21/552
(Continued)

FOREIGN PATENT DOCUMENTS

CN      1949774 A     4/2007
CN    102473229 A     5/2012
(Continued)

OTHER PUBLICATIONS

Nicodemos C. Damianou, A Policy Framework for Management of Distributed Systems, a thesis submitted in partial fulfilment of the requirements for the degree of Doctor of Philosophy in the Faculty of Engineering of the University of London, and for the Diploma of the Imperial College of Science, Technology and Medicine. Feb. 2002. total 233 pages. XP2650837A.

(Continued)

*Primary Examiner* — Khalil Naghdali
(74) *Attorney, Agent, or Firm* — Huawei Technologies Co., Ltd.

(57) ABSTRACT

The application relates to controlling access in a software-defined network (SDN). A controller in the SDN receives an access request from an application program. The controller determines whether an operation on a resource as specified in the access request belongs to a permission list corresponding to the application program. The permission list includes a list of permitted operations on the resource by the application program. When the operation as specified in the access request belongs to the permission list, the controller sends a reply message allowing access by the application program. In this way, accesses by the application program are restricted according to the permission list, and malicious attacks from the application program can be prevented to ensure network security.

8 Claims, 3 Drawing Sheets

(58) Field of Classification Search
USPC .............................................................. 726/4
See application file for complete search history.

(56) References Cited

U.S. PATENT DOCUMENTS

| | | | |
|---|---|---|---|
| 2005/0283830 A1* | 12/2005 | Guthery | .................. G06F 21/31 |
| | | | 726/4 |
| 2009/0006618 A1 | 1/2009 | Hayton | |
| 2009/0288136 A1 | 11/2009 | Chang et al. | |
| 2011/0055902 A1 | 3/2011 | Brodfuehrer et al. | |
| 2014/0020069 A1* | 1/2014 | Bowman | ............. G06F 21/6218 |
| | | | 726/4 |
| 2014/0052836 A1* | 2/2014 | Nguyen | ................ H04L 45/306 |
| | | | 709/223 |
| 2014/0075498 A1 | 3/2014 | Porras et al. | |
| 2014/0359697 A1 | 12/2014 | Ji | |
| 2015/0089575 A1* | 3/2015 | Vepa | ....................... G06F 21/62 |
| | | | 726/1 |
| 2015/0180872 A1* | 6/2015 | Christner | ................ H04L 63/10 |
| | | | 726/4 |

FOREIGN PATENT DOCUMENTS

| | | |
|---|---|---|
| CN | 103095701 A | 5/2013 |
| CN | 103685580 A | 3/2014 |
| CN | 104113839 A | 10/2014 |
| WO | 2014143025 A1 | 9/2014 |

OTHER PUBLICATIONS

George Coulouris et al. Distributed Systems Concepts and Design,Fifth Edition. Addison-Wesley. May 2011. total 1067 pages. XP55319910A.
Search report issued in corresponding European patent application No. 15881716.3,dated Nov. 14, 2017,total 9 pages.
Haleplidis S et al.: "SON Layers and Architecture Terminology; draft-haleplidis-sdnrg-layer-terminology-02. txt", Nov. 2013 (Nov. 5, 2013), pp. 1-15, XP015096013.

* cited by examiner

METHOD FOR CONTROLLING PERMISSION OF APPLICATION PROGRAM AND CONTROLLER

CROSS-REFERENCE TO RELATED APPLICATIONS

This application is a continuation of International Application No. PCT/CN2015/083522, filed on Jul. 8, 2015, which claims priority to Chinese Patent Application No. 201510064799.5, filed on Feb. 9, 2015. The disclosures of the aforementioned patent applications are hereby incorporated by reference in their entireties.

STATEMENT OF JOINT RESEARCH AGREEMENT

The subject matter and the claimed invention were made by or on the behalf of Xi'an Jiaotong University, of Xi'an, Shaanxi Province, P. R. China and Huawei Technologies Co., Ltd., of Shenzhen, Guangdong Province, P. R. China, under a joint research agreement titled "SDN Application Rights Management" The joint research agreement was in effect on or before the claimed invention was made, and that the claimed invention was made as a result of activities undertaken within the scope of the joint research agreement.

TECHNICAL FIELD

Embodiments of the present application relate to the communications field, and more specifically, to a method for controlling a permission of an application program and a controller.

BACKGROUND

Software-defined network (SDN) is a network architecture in which control functions are separated from forwarding functions. Control functions of a SDN are centralized at a controller, and application programs (APPs) are deployed at a layer above the controller. In this way, an upper-layer application program can access the network through the controller.

However, application programs may come from various sources, and the controller is unable to know whether a source of an application program is reliable. This easily exposes the controller to attacks from unsecure application programs, causing malicious attacks to the network. Consequently, cyber security may be threatened.

SUMMARY

Embodiments of the present application provide a method for controlling a permission of an application program. This method can prevent malicious attacks from application programs to ensure cyber security.

According to a first aspect, a method for controlling a permission of an application program is provided, including: receiving, by a controller, an access request of an application program; determining, by the controller, whether the access request belongs to a permission list corresponding to the application program, where the permission list is a list of operation permissions on a resource; and allowing, by the controller, access by the application program if the access request belongs to the permission list.

With reference to the first aspect, in a first possible implementation of the first aspect, before the receiving, by a controller, an access request of an application program, the method further includes:

receiving, by the controller, a permission request sent by the application program; and generating, by the controller according to the permission request, the permission list corresponding to the application program.

With reference to the first possible implementation of the first aspect, in a second possible implementation of the first aspect, the generating, by the controller according to the permission request, the permission list corresponding to the application program includes:

generating the permission list according to the permission request by using a permission filter, where the permission filter includes at least one atomic filter, and one of the at least one atomic filter is configured to define a filter expression for one attribute dimension of application programming interface (API) calling of the controller.

With reference to either of the possible implementations of the first aspect, in a third possible implementation of the first aspect, the generating, according to the permission request, the permission list corresponding to the application program includes: determining, according to a security constraint, whether the permission request is authorized, where the security constraint is used to define a range of permissions grantable by the controller; and generating the permission list when it is determined that the permission request is authorized.

With reference to any one of the first aspect or possible implementations of the first aspect, in a fourth possible implementation of the first aspect, the determining whether the access request belongs to a permission list corresponding to the application program includes:

transforming the access request into a disjunctive normal form, and transforming the permission list into a conjunctive normal form; and determining whether the disjunctive normal form belongs to the conjunctive normal form; and the allowing, by the controller, access by the application program if the access request belongs to the permission list includes:

allowing, by the controller, the access by the application program if the disjunctive normal form belongs to the conjunctive normal form.

According to a second aspect, a controller is provided, including:

a receiving unit, configured to receive an access request of an application program;

a determining unit, configured to determine whether the access request received by the receiving unit belongs to a permission list corresponding to the application program, where the permission list is a list of operation permissions on a resource; and an execution unit, configured to allow access by the application program when the determining unit determines that the access request belongs to the permission list.

With reference to the second aspect, in a first possible implementation of the second aspect, the receiving unit is further configured to receive a permission request sent by the application program; and the execution unit is further configured to generate, according to the permission request, the permission list corresponding to the application program.

With reference to the first possible implementation of the second aspect, in a second possible implementation of the second aspect, the execution unit is specifically configured to: generate the permission list according to the permission request by using a permission filter, where the permission filter includes at least one atomic filter, and one of the at least one atomic filter is configured to define a filter expression for one attribute dimension of application programming interface API calling of the controller.

With reference to either of the possible implementations of the second aspect, in a third possible implementation of the second aspect, the execution unit is specifically configured to:

determine, according to a security constraint, whether the permission request is authorized, where the security constraint is used to define a range of permissions grantable by the controller; and generate the permission list when it is determined that the permission request is authorized.

With reference to any one of the second aspect or the possible implementations of the second aspect, in a fourth possible implementation of the second aspect, the determining unit is specifically configured to: transform the access request into a disjunctive normal form, and transform the permission list into a conjunctive normal form; and determine whether the disjunctive normal form belongs to the conjunctive normal form; and the execution unit is specifically configured to allow the access by the application program when the determining unit determines that the disjunctive normal form belongs to the conjunctive normal form.

In the embodiments of the present application, a controller determines whether an access request of an application program belongs to a permission list corresponding to the application program. In this way, an access permission of the application program is restricted according to the permission list, and further a malicious attack from the application program can be prevented to ensure cyber security.

DESCRIPTION OF EMBODIMENTS

The following describes the technical solutions in the embodiments of the present application with reference to the accompanying drawings. Apparently, the described embodiments are some but not all of the embodiments of the present application.

Figure 1:
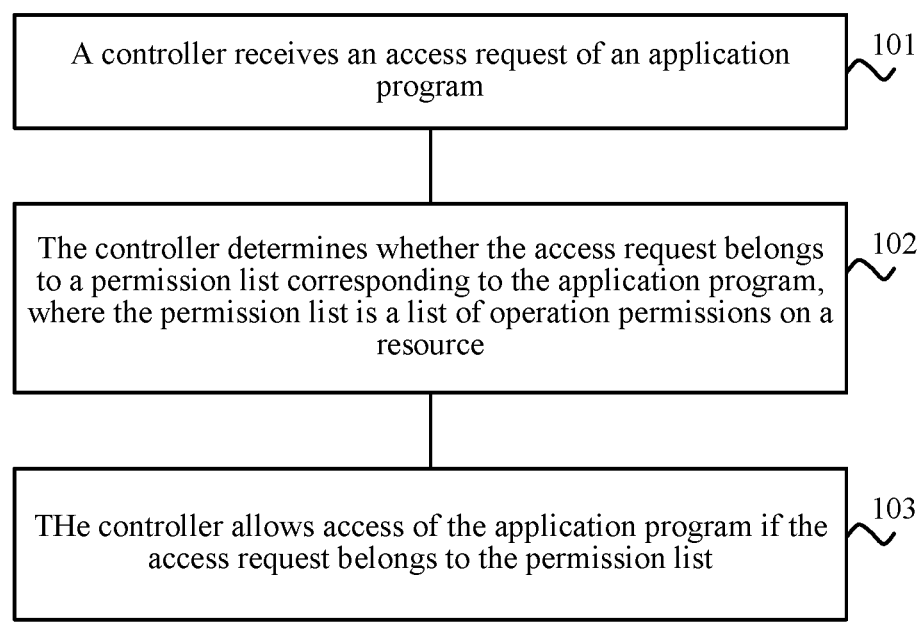
FIG. 1 is a flowchart of a method for controlling a permission of an application program according to an embodiment of the present application.

FIG. 1 is a flowchart of a method for controlling a permission of an application program according to an embodiment of the present application. The method shown in FIG. 1 includes the following steps:

101. A controller receives an access request from an application program.

102. The controller determines whether the access request belongs to a permission list corresponding to the application program, where the permission list is a list of operation permissions on a resource.

103. The controller allows access by the application program if the access request belongs to the permission list.

In this embodiment of the present application, a controller determines whether an access request of an application program belongs to a permission list corresponding to the application program. In this way, an access permission of the application program is restricted according to the permission list, and further a malicious attack from an application program can be prevented to ensure cyber security.

It can be understood that the method shown in this embodiment is applied to the field of SDN technologies. Correspondingly, the controller shown in this embodiment of the present application is a controller in an SDN.

Optionally, the controller stores the permission list corresponding to the application program. The permission list may be pre-configured by an administrator, or may be pre-configured by the controller according to a range of permissions grantable by the controller.

It should be noted that a form of the permission list is not limited in the present application. For example, the permission list may be in a list form, a tabular form, or a set form. In this embodiment of the present application, a name of the permission list should not be construed as a limitation on the form of the permission list.

Alternatively, before step 101, the method may further include: generating, by the controller, the permission list corresponding to the application program. In an example, the controller may receive a permission request from the application program; and generate, according to the permission request, the permission list corresponding to the application program.

In this embodiment of the present application, access to the controller by the application program includes access to a resource. The resource includes at least one of the following: a flow table, a topology, statistics and errors, a group table, traffic shaping, an operating system, an incoming packet (Packet_in) or an outgoing packet (Packet_out). As shown in Table 1, an operation on a resource may be read, write, or event callback.

In this embodiment of the present application, the permission list may be used to define operation permissions on a resource. For example, the third column shown in Table 1 includes permissions defined in this embodiment of the present application.

TABLE 1

| Resources | Operations | Permissions |
| --- | --- | --- |
| Flow table | Read | read flow table |
|  | Write | insert flow |
|  |  | delete flow |
|  | Event callback | flow event |
| Topology | Read | visible topology |
|  | Write | modify topology |
|  | Event callback | topology event |
| Statistics and errors | Read | read statistics |
|  | Event callback | error event |
| Packet_in and packet_out | Read | read pkt in payload |
|  | Write | send pkt out |
|  | Event callback | pkt in event |
| Group table | Read | read group table entry |
|  | Write | insert group table entry |
|  |  | delete group table entry |
|  | Event callback | flow event |

TABLE 1-continued

| Resources | Operations | Permissions |
|---|---|---|
| Traffic shaping | Read | read meter table |
| | Write | insert meter table entry |
| | | delete meter table entry |
| | Event callback | flow event |
| Operating system | | file system access |
| | | process runtime access |
| | | network access |

To limit the scope of the permissions shown in Table 1, this embodiment of the present application defines a permission language. Specifically, the permission language and its denotations are described as follows:

PERM: specifies a permission name;

LIMITING: specifies start of permission limiting;

AND: a binary operator that specifies an AND operation, whose result is true when both operands are true;

OR: a binary operator that specifies an OR operation, whose result is true when either operand is true;

NOT: a unary operator that specifies a negation operation, which indicates negation of a current operand;

IP_SRC (V6 or V4): specifies a source IP address, whose value may be an integer variable or may be an IP-format character string;

IP_DST (V6 or V4): specifies a destination IP address, whose value may be an integer variable or may be an IP-format character string;

TCP_SRC: specifies a TCP source address, whose value may be an integer variable or may be an IP-format character string;

TCP_DST: specifies a TCP destination address, whose value may be an integer variable or may be an IP-format character string;

MASK: specifies a subnet mask, whose value may be an integer variable or may be an IP-format character string;

WILDCARD: means wildcard matching;

DROP: means dropping a current packet;

FORWARD: means forwarding a current packet;

MODIFY: means modifying a current packet, and requires limiting a modifiable field in specific use;

OWN_FLOWS: an ownership permission, which allows viewing or modifying only a flow table rule created by an APP itself;

ALL_FLOWS: an ownership permission, which allows viewing or modifying all flow table rules;

GROUP_FLOW: an ownership permission, which allows viewing or modifying only a group table rule created by an APP itself;

ALL_GROUP_FLOWS: an ownership permission, which allows viewing or modifying all group table rules;

METER_FLOW: an ownership permission, which allows viewing or modifying only a meter_table rule created by an APP itself;

ALL_METER_FLOWS: an ownership permission, which allows viewing or modifying all meter_table rules;

MAX_PRIORITY: limits a maximum priority for creating or modifying a rule;

MIN_PRIORITY: limits a minimum priority for creating or modifying a rule;

MAX_RULE_COUNT: limits a quantity of rules on one switch;

FROM_PKT_IN: allows sending a packet to the outside only in response to a packet-in message;

ARBITRARY: allows sending a packet to the outside in any case;

SWITCH: limits an operable switch, which may be a switch or a group of switches in specific use, and is used in combination with LINK to limit an operable link;

LINK: limits an operable link, which may be a link or a group of links in specific use;

ALL_SWITCHES: allows operating all switches;

BORDER_SWITCHES: allows operating border switches;

VIRTUAL: limits an operable virtual switch;

SINGLE_BIG_SWITCH: indicates limitation to a single virtual switch;

ALL_ADJACENT_LINKS: indicates limitation to all links immediately adjacent to the switch;

PATHS_AS_LINKS: indicates limitation to a link immediately or non-immediately adjacent to the switch;

EVENT_INTERCEPTION: allows listening to and intercepting a callback event;

MODIFY_EVENT_ORDER: allows modifying an order for processing callback events by an APP;

FLOW_LEVEL: allows viewing flow-level statistics;

PORT_LEVEL: allows viewing port-level statistics; and

SWITCH_LEVEL: allows viewing switch-level statistics.

Therefore, by using the foregoing permission language, an access permission of an application program may be described and defined.

Specifically, in this embodiment of the present application, when generating the permission list, the controller may determine, according to a security constraint, whether the permission request is authorized, and generate the permission list when determining that the permission request is authorized. The security constraint is used to define a range of permissions grantable by the controller. Herein, the range of permissions grantable by the controller may be defined and configured on the controller by an administrator in advance.

It can be understood that the controller does not generate the permission list when determining that the permission request is not authorized, and further, does not allow access by the application program.

In this embodiment of the present application, the permission request of the application program may be understood as a rough permission list, which indicates an all-or-none authorization manner. That is, all are allowed or none is allowed, and a limitation granularity is relatively coarse. Correspondingly, the permission list generated by the controller may be understood as a refined permission list used to limit the range of permissions.

Further, that the controller generates the permission list may include: generating the permission list according to the permission request by using a pre-defined permission syntax rule.

Specifically, the controller may generate the permission list according to the permission request and the security constraint by using the pre-defined permission syntax rule.

Herein, the pre-defined permission syntax rule may be expressed as a permission filter. Therefore, it can be understood that, that the controller generates the permission list may include: The controller generates the permission list according to the permission request by using the permission filter; or the controller may generate the permission list according to the permission request and the security constraint by using the permission filter.

In this embodiment of the present application, the permission filter includes at least one atomic filter, and the at least one atomic filter is configured to define a filter expression for one attribute dimension of application programming interface (API) calling of the controller.

The atomic filter may be a construction block of the filter expression. Calling an API of the controller by an application program is usually associated with a specific quantity of parameters and a runtime attribute, such as a flow table entry match field and a target switch. The atomic filter may divide API calls according to a specific attribute dimension of API calling. Different atomic filters check different attribute dimensions. Therefore, different atomic filters are independent of each other. Usually, one atomic filter is a subset of permissions including a specific attribute.

It should be noted that a manner of attribute dimension division is not limited in this embodiment of the present application. For example, an attribute dimension may be determined according to the resources shown in Table 1. For example, the attribute dimensions may include: flow, topology, event callback, statistics, group table, and traffic shaping.

Further, atomic filters may include: a flow filter, a topology filter, an event callback filter, a statistics filter, a group table filter, and a traffic shaping filter. Specifically, denotations of these filters may be described as follows:

(a) Flow filter: A flow filter applies to API calls with a specific flow parameter. Therefore, the flow filter may be associated with a flow table resource in permission management. The flow filter checks several types of input.

Specifically, a parameter in an API call may be compared with a filter parameter. A value of the filter parameter may be a specific value or a range, and the range may be denoted by using a bitwise mask.

For example,

---
PERM read_flow_table LIMITING
IP_DST 10.13.0.0 MASK 255.255.0.0
---

In this case, only a flow table entry in a specific subnet is visible to this application program.

In addition, a wildcard field may be further checked. In the case of association with the read_flow_table permission, this means a quantity of bits in a flow table entry match field that are visible to the application program. In the case of association with the insert_flow or delete_flow permission, this can ensure that the application program generates a proper wildcard bit. For example, a load-balancing APP that processes only the low-order 8 bits of a destination IP address of a packet should have the following permission:

---
PERM insert_flow LIMITING
WILDCARD IP_DST 255.255.255.0
---

This indicates that the high-order 24 bits of a destination IP address of any newly inserted rule should be wildcards, and only the low-order 8 bits of the destination IP address may be designated. Therefore, the high-order 24 bits of the IP destination address of any packet cannot be modified by the APP, and only the low-order 8 bits of the destination IP address can be modified by the APP.

In this embodiment of the present application, the flow filter may further include: an action filter, an ownership filter, a priority filter, a table-size filter, and a packet-out filter.

The action filter recognizes an action that a flow is dropped, forwarded, or modified upon a specific field. The ownership filter recognizes and traces all senders of existing flows. The priority filter limits a maximum/minimum priority value with which an application program can set a flow rule for the application program. The table-size filter limits a maximum quantity of rules that can be applied by an application program to a switch. The packet-out filter, if set to FROM_PKT_IN, can prevent an application program from sending any packet at a data layer (that is, a packet not in response to packet_in).

It can be understood that the attribute dimensions may include action, ownership, priority, table size, and packet-out.

It can be learned that in this embodiment of the present application, the flow filter may limit visibility or operability of a flow table.

(b) Topology filter: A topology filter checks a switch and a link that are visible and operable to an application program. The topology filter may work in a physical topology structure, or may work in a created virtual topology structure.

In this embodiment of the present application, the topology filter may further include a physical topology filter and a virtual topology filter.

The physical topology filter may expose a subset of a physical switch and link to an application program.

For example,

---
PERM visible_topology LIMITING
SWITCH BORDER_SWITCHES LINKPATHS_AS_LINKS
---

The application program is allowed to view all border switches and all paths between the switches in the topology structure.

The virtual topology filter may consider an entire network as a big switch, or divide an entire network into multiple virtual networks.

For example,

---
PERM visible_topology LIMITING
VIRTUAL SINGLE_BIG_SWITCH LINK ALL_ADJACENT_LINKS
---

The application program is allowed to consider the network topology as one single big switch.

It can be understood that the attribute dimensions may also include physical topology and virtual topology.

(c) Event callback filter: An event callback filter may be used to check two specific application program behaviors in an event callback process, which are respectively: (1) intercepting a callback event; and (2) modifying an order for processing callback events by an application program.

In this embodiment of the present application, the event callback filter may further include: an event listening filter and an event order filter.

The event listening filter may check whether an application program can intercept a callback event, that is, preventing an event from being processed by another application program. The event order filter may check whether an API call attempts to modify the order of processing of callback events by the application program.

It can be understood that the attribute dimensions may also include event listening and event order.

(d) Statistics filter: A statistics filter may limit data visible to an application program to one or more of three levels. The three levels include: a flow level (FLOW_LEVEL), a port level (PORT_LEVEL), and a switch level (SWITCH_LEVEL). It can be learned that the statistics filter is a unique filter that effectively applies to the read_statistics permission.

(e) Group table filter: A group table filter may set whether an APP can deliver a group table permission. In OpenFlow (OpenFlow), a group table may be used in multicast, multipath, fault recovery, and the like.

For example,

```
PERM insert_group_table_entry LIMITING
IP_DST 10.13.0.0 MASK 255.255.0.0
```

This limits that a group table entry (group_table_entry) may be inserted (insert) only for a specific subnet.

(f) Traffic shaping filter: A traffic shaping filter may limit that an APP can perform traffic shaping only at a specific port of a specific switch. In OpenFlow, the controller may shape flows on a network, for example, limiting a 10 M bit/s port to a rate of 3 M bit/s.

For example,

PERM insert_meter_table_entry LIMITING SWITCH 1

This limits that a meter table entry may be inserted only for a switch 1.

In this embodiment of the present application, when the permission filter includes multiple atomic filters, the multiple atomic filters are connected by using a logical operator.

Logical operators include AND (AND), OR (OR), and NOT (NOT).

For example, an APP may be granted a read_flow_table permission, with limitation to only a flow previously released by the APP or only affecting a subnet 10.13.0.0/16:

```
PERM read_flow_table LIMITING OWN_FLOWSOR
IP_SRC 10.13.0.0 MASK 255.255.0.0
OR IP_DST 10.13.0.0 MASK 255.255.0.0
```

Therefore, in this embodiment of the present application, the controller may generate the permission list by using a permission filter.

For example,

ERM pkt_in LIMITING EVENT_INTERCEPTION AND FROM_PKT_IN

This allows intercepting a callback event, and allows sending a pkt-out message in response to a pkt-in message.

For another example,

PERM pkt_in LIMITING EVENT_INTERCEPTION AND ARBITRARY

This allows intercepting a callback event, and allows sending a pkt-out message in any case.

Specifically, in this embodiment of the present application, the controller may include a constraint engine, and the constraint engine generates the permission list.

It can be understood that the permission list corresponding to the application program is a set of permissions grantable by the controller for the application program.

In the embodiment shown in FIG. 1, the access request in step 101 may be a request of the APP to access an API. After step 101, the controller may find a specific permission according to the request to access the API.

Specifically, the controller may pre-store an "API/permission" correspondence. Then, the controller may search the correspondence to determine a permission corresponding to the access request.

For example, the correspondence may be shown in Table 2.

TABLE 2

| APIs | Corresponding Permissions |
|---|---|
| OFSwitchImpl.write(OFType.FLOW_MOD) addOFMessageListener . . . | insert flow read pkt in payload . . . |

Correspondingly, it can be understood that, in step 102, that the controller determines whether the access request belongs to the permission list may include: The controller determines whether the permission corresponding to the access request belongs to the permission list.

In step 102, if the access request is an access request for one attribute dimension of API calling, in step 102, comparison with a filter expression, in the permission list, of a corresponding atomic filter may be performed.

That is, direct comparison may be performed between atomic filters. For example, for atomic filters of a same type, specific parameters need to be compared. For example, corresponding to statistics filters, comparison whether the filters are at the FLOW_LEVEL, the PORT_LEVEL, or the SWITCH_LEVEL is needed.

Different types of atomic filters are apparently different. Rules included in different types of atomic filters are not all the same. For example, a SWITCH_LEVEL statistics filter includes the FLOW_LEVEL and the PORT_LEVEL, while a PORT_LEVEL statistics filter includes the FLOW_LEVEL. However, among flow filters, DROP and FORWARD action filters cannot be mutually included.

It should be noted that in this embodiment of the present application, a manner of comparison between atomic filters is not described.

If the access request is an access request for multiple attribute dimensions of API calling, in step 102, comparison with filter expressions in the permission list that are corresponding to multiple atomic filters connected by using a logical operator may be performed. In this case, step 102 may include: transforming the access request into a disjunctive normal form, and transforming the permission list into a conjunctive normal form; and determining whether the disjunctive normal form belongs to the conjunctive normal form.

For example, it is assumed that the permission list may be denoted by A, and that the access request may be denoted by B. Determining whether the access request belongs to the permission list may be equivalent to determining whether A includes B.

Step 1. Transform A into a conjunctive normal form (a and b and c and . . . ), and transform B into a disjunctive normal form (x or y or z or . . . ).

A transformation process is implemented by using the double negation law, the De Morgan's laws, the distribution law, and the like on a propositional formula in discrete mathematics.

(1) Transform A into the conjunctive normal form.

First, a not operation is recursively resolved by using a negation law.

For example, not (a and b)=>(not a) or (not b).

Then, an or operation is recursively resolved by using the distribution law.

For example, (a and b) or c=>(a or c) and (b or c).

(2) Transform B into the disjunctive normal form.

First, a not operation is recursively resolved by using the negation law.

For example, not (a or b)=>(not a) and (not b).

Then, an or operation is recursively resolved by using the distribution law.

For example, (a or b) and c=>(a and c) or (b and c).

It should be noted that in this embodiment of the present application, for a manner in which A is transformed into the conjunctive normal form, and a manner in which B is transformed into the disjunctive normal form, refer to the prior art. To avoid repetition, details are not further described herein.

Step 2. Determine whether the conjunctive normal form includes the disjunctive normal form.

Specifically, it needs to be determined whether every sub-clause in the conjunctive normal form includes every sub-clause in the disjunctive normal form.

For example, assuming that the conjunctive normal form is expressed as a form of a1 and a2 and a3 and . . . , and the disjunctive normal form is expressed as a form of x1 or x2 or x3 . . . , it needs to be determined whether ai including xj holds, where i=1, 2, 3 . . . , and j=1, 2, 3 . . . .

It should be noted that, if a1=a11 or a12, and x1=x11 and x12, when whether a1 includes x1 is determined, it needs to be determined whether a11 includes x11 and a11 includes x12, or whether a12 includes x11 and a12 includes x12.

It should be noted that in this embodiment of the present application, for a manner of determining whether the conjunctive normal form includes the disjunctive normal form, refer to the prior art related to logical decision. To avoid repetition, details are not further described herein.

In an example, in step 102, it is assumed that the permission list may be denoted by A, and that the access request may be denoted by B. In addition, A and B may be expressed as follows:

```
A= {
PERM read_statistics LIMITING SWITCH_LEVEL
PERM network_access LIMITING
IP_DST 192.168.0.0 MASK 255.255.0.0
}
B = {
PERM read_statistics LIMITING PORT_LEVEL
PERM network_access LIMITING
IP_DST 192.168.1.0 MASK 255.255.255.0
or IP_DST 192.168.2.0 MASK 255.255.255.0
}
```

Then, determining whether B belongs to A is determining whether B<=A holds.

First, A may be transformed into the conjunctive normal form, that is:

A=>(SWITCH_LEVEL) and (IP_DST 192.168.0.0 MASK 255.255.0.0); and

B is transformed into the disjunctive normal form, that is:

B=>(PORT_LEVEL and ((IP_DST 192.168.1.0 MASK 255.255.255.0)) or (PORT_LEVEL and ((IP_DST 192.168.2.0 MASK 255.255.255.0)).

Then, whether the conjunctive normal form includes the disjunctive normal form may be determined, to determine whether A includes B, and further determine whether the access request belongs to the permission list.

Specifically, in this embodiment of the present application, the controller may include a permission engine, and the permission engine executes the determining process in step 102.

In this way, the controller determines whether the access request belongs to the permission list, to determine whether access by the application program is authorized. If it is determined that the access request belongs to the permission list, step 103 may be performed.

Figure 2:
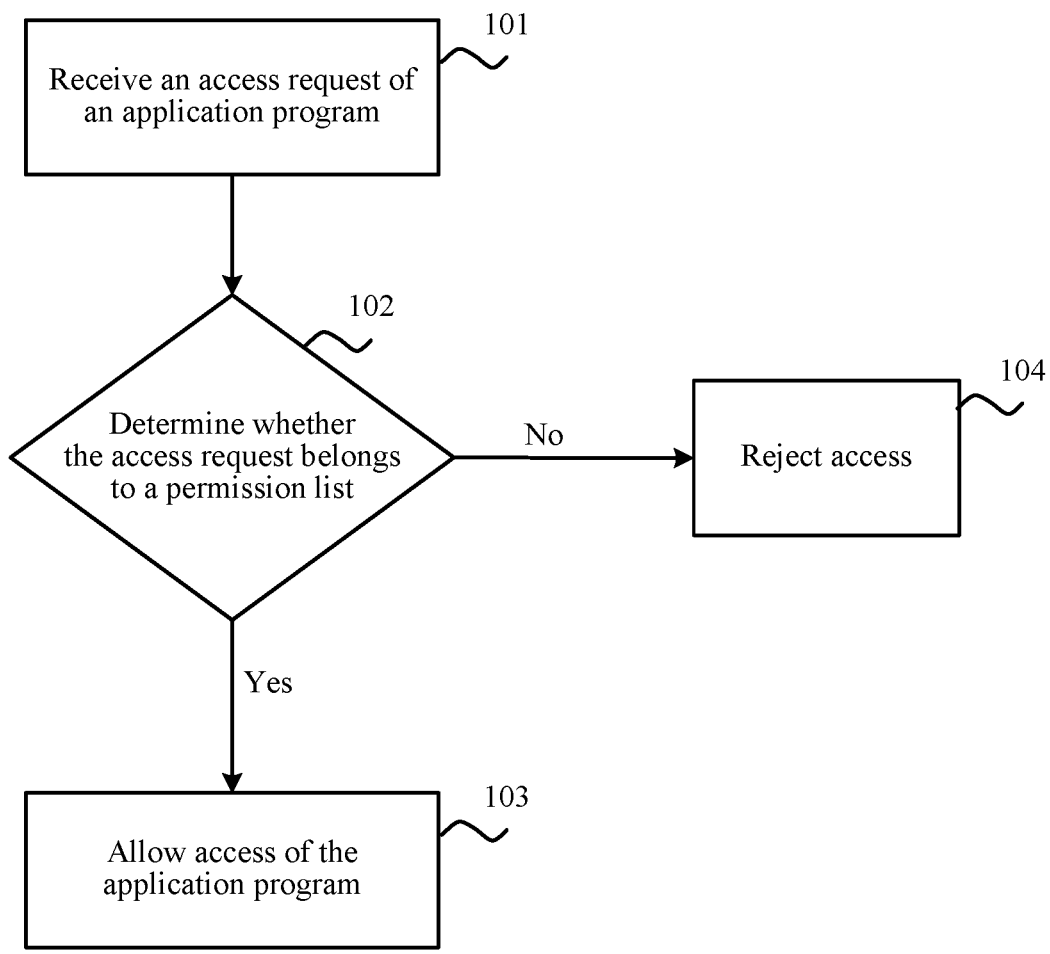
FIG. 2 is a flowchart of a method for controlling a permission of an application program according to another embodiment of the present application.

FIG. 2 is a flowchart of a method for controlling a permission of an application program according to an embodiment of the present application. If, in step 102, the controller determines that the access request does not belong to the permission list, step 104 may be further performed, that is, the controller does not allow access by the application program.

Alternatively, it can be understood that, if the controller determines that the access request does not belong to the permission list, it may be considered that the access by the application program is not authorized. That is, there is a possibility that the controller be maliciously attacked by the application program. Then, further access by the application program is prevented. In this way, cyber security can be ensured.

Figure 3:
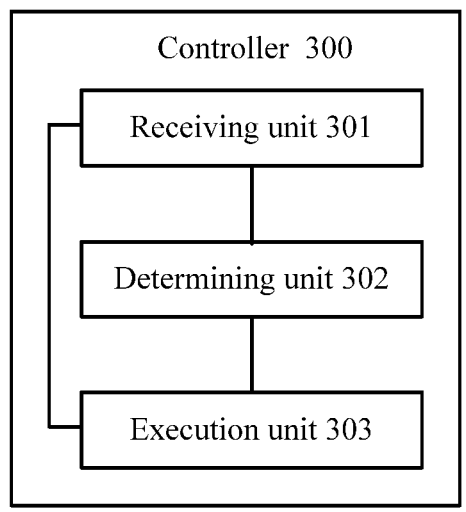
FIG. 3 is a block diagram of a network controller according to an embodiment of the present application.

FIG. 3 is a structural block diagram of a controller according to an embodiment of the present application. The controller 300 shown in FIG. 3 includes a receiving unit 301, a determining unit 302, and an execution unit 303.

The receiving unit 301 is configured to receive an access request of an application program.

The determining unit 302 is configured to determine whether the access request received by the receiving unit 301 belongs to a permission list corresponding to the application program. The permission list is a list of operation permissions on a resource.

The execution unit 303 is configured to allow access by the application program when the determining unit 302 determines that the access request belongs to the permission list.

In this embodiment of the present application, the controller determines whether an access request of an application program belongs to a permission list corresponding to the application program. In this way, an access permission of the application program is restricted according to the permission list, and further a malicious attack from the application program can be prevented to ensure cyber security.

In this embodiment of the present application, access to the controller by the application program includes access to a resource. The resource includes at least one of the following: a flow table, a topology, statistics and errors, a group table, traffic shaping, an operating system, or packet-in (Packet_in) and packet-out (Packet_out). An operation on a resource may be read, write, or event callback.

Optionally, the controller stores the permission list corresponding to the application program. The permission list may be pre-configured by an administrator, or may be pre-configured by the controller according to a range of permissions grantable by the controller.

Optionally, in an embodiment, the receiving unit 301 is further configured to receive a permission request sent by the application program; and the execution unit 303 is further configured to generate, according to the permission request, the permission list corresponding to the application program.

In this embodiment of the present application, the permission list may be used to define operation permissions on a resource. For example, the third column shown in the foregoing Table 1 includes permissions defined in this embodiment of the present application.

Specifically, the execution unit 303 is configured to generate the permission list according to the permission request by using a permission filter.

The permission filter includes at least one atomic filter, and one of the at least one atomic filter is configured to define a filter expression for one attribute dimension of API calling of the controller.

It can be understood that the permission filter may include multiple atomic filters, and the multiple atomic filters are connected by using a logical operator.

Optionally, in another embodiment, the execution unit 303 is specifically configured to: determine, according to a security constraint, whether the permission request is authorized, where the security constraint is used to define a range of permissions grantable by the controller, and generate the permission list when determining that the permission request is authorized.

Optionally, in another embodiment, the determining unit 302 is specifically configured to: transform the access request into a disjunctive normal form, and transform the permission list into a conjunctive normal form; and determine whether the disjunctive normal form belongs to the conjunctive normal form. The execution unit 303 is specifically configured to allow the access by the application program when the determining unit 302 determines that the disjunctive normal form belongs to the conjunctive normal form.

The controller 300 can be configured to implement the controller-performed method in the embodiment in FIG. 1 or FIG. 2. To avoid repetition, details are not further described herein.

Figure 4:
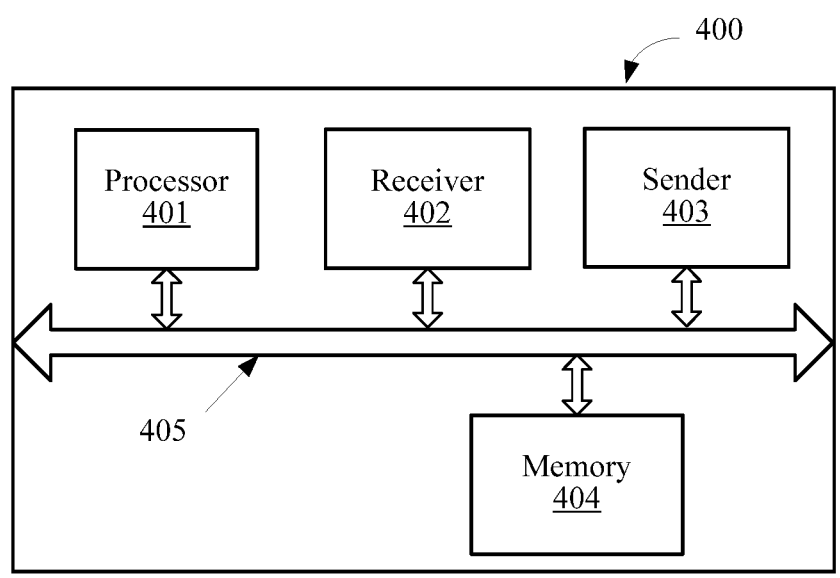
FIG. 4 is a simplified structural block diagram of a network controller according to another embodiment of the present application.

FIG. 4 is a structural block diagram of a controller according to another embodiment of the present application. The controller 400 shown in FIG. 4 includes a processor 401, a receiver 402, a sender 403, and a memory 404.

The receiver 402 is configured to receive an access request of an application program.

The processor 401 is configured to determine whether the access request received by the receiver 402 belongs to a permission list corresponding to the application program. The permission list is a list of operation permissions on a resource.

The processor 401 is further configured to allow access by the application program when determining that the access request belongs to the permission list.

In this embodiment of the present application, a controller determines whether an access request of an application program belongs to a permission list corresponding to the application program. In this way, an access permission of the application program is restricted according to the permission list, and further a malicious attack from the application program can be prevented to ensure cyber security.

Components of the controller 400 are coupled together by using a bus system 405. In addition to a data bus, the bus system 405 further includes a power supply bus, a control bus, and a state signal bus. However, for clear description, various buses are marked as the bus system 405 in FIG. 4.

The methods disclosed in the foregoing embodiments of the present application may be applied to the processor 401 or implemented by the processor 401. The processor 401 may be an integrated circuit chip provided with a signal processing capability. During implementation, steps of the foregoing methods may be implemented by using an integrated logic circuit of hardware in the processor 401 or by using an instruction in a form of software. The processor 401 may be a general-purpose processor, a digital signal processor (DSP), an application-specific integrated circuit (ASIC), a field programmable gate array (FPGA) or another programmable logic device, a discrete gate or transistor logical device, or a discrete hardware assembly. The processor 401 may implement or execute methods, steps, and logic block diagrams disclosed in the embodiments of the present application. The general-purpose processor may be a microprocessor, or the processor may be any conventional processor or the like. Steps of the methods disclosed with reference to the embodiments of the present application may be directly executed and completed by using a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 404, and the processor 401 reads information from the memory 404 and implements the steps in the foregoing methods in combination with hardware of the processor 401.

It can be understood that the memory 404 in this embodiment of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used for external high-speed cache. Through illustrative but not limitation-imposing descriptions, RAMs in many forms may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory SLDRAM), and a direct memory bus random access memory (DR RAM). The memory 404 in a system and the method described in this specification aims to include without being limited to these memories and any other proper types of memories.

It can be understood that the sender 403 in this embodiment of the present application may be configured to send an execution result of the processor 401 to a device communicating with the controller 400, such as an application program or a switch.

It can be understood that the embodiments described in this specification may be implemented by using hardware, software, firmware, middleware, microcode, or a combination thereof. For hardware implementation, a processing unit may be implemented in one or more application-specific integrated circuits (ASIC), a digital signal processor (DSP), a digital signal processing device (DSPD), a programmable logic device (PLD), a field-programmable gate array (FPGA), a general-purpose processor, a controller, a micro controller, another electronic unit used to execute the functions specified in this application, or a combination thereof.

When the embodiments are implemented in software, firmware, middleware, microcode, program code, or a code segment, the software, firmware, middleware, microcode, program code, or code segment may be stored in, for example, a machine-readable medium of a storage component. The code segment may represent a process, a function, a subprogram, a program, a routine, a subroutine, a module, a software group, a class, or any combination of an instruction, a data structure, or a program statement. The code segment may be coupled to another code segment or a hardware circuit by transferring and/or receiving information, data, an independent variable, a parameter, or memory content. The information, the independent variable, the parameter, the data, and the like may be delivered, forwarded, or sent in any proper manner, such as memory sharing, message transfer, token transfer, or network transmission.

For software implementation, the technologies in this specification may be implemented by using modules (for example, processes and functions) executing the functions in this specification. Software code may be stored in a memory unit and executed by using a processor. The memory unit may be implemented inside the processor or outside the processor, and in the latter case, the memory unit may be coupled to the processor by means of communication by using various means known in the art.

In this embodiment of the present application, access to the controller by the application program includes access to a resource. The resource includes at least one of the following: a flow table, a topology, statistics and errors, a group table, traffic shaping, an operating system, or packet-in (Packet_in) and packet-out (Packet_out). An operation on a resource may be read, write, or event callback.

Optionally, the controller stores the permission list corresponding to the application program. The permission list may be pre-configured by an administrator, or may be pre-configured by the controller according to a range of permissions grantable by the controller.

Optionally, in an embodiment, the receiver 402 is further configured to receive a permission request sent by the application program; and the processor 401 is further configured to generate, according to the permission request, the permission list corresponding to the application program.

In this embodiment of the present application, the permission list may be used to define operation permissions on a resource. For example, the third column shown in the foregoing Table 1 includes permissions defined in this embodiment of the present application.

Specifically, the processor 401 is configured to generate the permission list according to the permission request by using a permission filter.

The permission filter includes at least one atomic filter, and one of the at least one atomic filter is configured to define a filter expression for one attribute dimension of API calling of the controller.

It can be understood that the permission filter may include multiple atomic filters, and the multiple atomic filters are connected by using a logical operator.

Optionally, in another embodiment, the processor 401 is specifically configured to: determine, according to a security constraint, whether the permission request is authorized, where the security constraint is used to define a range of permissions grantable by the controller, and generate the permission list when determining that the permission request is authorized.

Optionally, in another embodiment, the processor 401 is specifically configured to:

transform the access request into a disjunctive normal form, and transform the permission list into a conjunctive normal form; and determine whether the disjunctive normal form belongs to the conjunctive normal form. When it is determined that the disjunctive normal form belongs to the conjunctive normal form, access by the application program is allowed.

The controller 400 can be configured to implement the controller-performed method in the embodiment in FIG. 1 or FIG. 2. To avoid repetition, details are not further described herein.

A person of ordinary skill in the art may be aware that the units and algorithm steps in the examples described with reference to the embodiments disclosed in this specification may be implemented by electronic hardware or by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for controlling access in a software-defined network (SDN), comprising:
obtaining, by a controller of the SDN, an access request from an application program, wherein the application program is running in the controller;
determining, by the controller, whether an operation on a resource as specified in the access request belongs to a permission list corresponding to the application program, wherein the permission list comprises a list of permitted operations on the resource by the application program; and
performing, by the controller, the operation on the resource as specified in the access request based on a determination that the operation on the resource as specified in the access request belongs to the permission list;
wherein the resource includes at least one of the following:
a flow table,
a topology,
statistics and errors,
a group table,
traffic shaping,
an operating system, and
an incoming packet or an outgoing packet;
wherein the operations on the resource includes at least one of the following:
read, write, or event callback;
wherein determining whether the operation on the resource as specified in the access request belongs to a permission list corresponding to the application program comprises:
transforming the access request into a disjunctive normal form, and transforming the permission list into a conjunctive normal form; and
determining whether the disjunctive normal form belongs to the conjunctive normal form; and wherein performing the operation on the resource as specified in the access request based on the determination that the operation as specified in the access request belongs to the permission list comprises:
performing, by the controller, the operation on the resource as specified in the access request based on a determination that the disjunctive normal form belongs to the conjunctive normal form.

2. The method according to claim 1, further comprising:
receiving, by the controller, a permission request from the application program; and
generating, by the controller according to the permission request, the permission list corresponding to the application program.

3. The method according to claim 2, wherein generating, according to the permission request, the permission list corresponding to the application program comprises:
generating, by the controller, the permission list according to the permission request by using a permission filter, wherein the permission filter comprises one or more atomic filters, and an atomic filter defines a filter expression for one attribute dimension of an application programming interface (API) calling of the controller.

4. The method according to claim 2, wherein generating, according to the permission request, the permission list corresponding to the application program comprises:
determining, by the controller according to a security constraint, whether the permission request is authorized, wherein the security constraint is used to define a range of permissions grantable by the controller; and
generating, by the controller, the permission list based on a determination that the permission request is authorized.

5. A controller in a software-defined network (SDN), comprising a processor and a memory;
wherein the processor is configured to:
obtain an access request from an application program, wherein the application program is running in the controller;
determine whether an operation on a resource as specified in the access request belongs to a permission list corresponding to the application program, wherein the permission list comprises a list of permitted operations on the resource by the application program; and
perform the operation on the resource as specified in the access request based on a determination that the operation on the resource as specified in the access request belongs to the permission list;
wherein the memory is configured to store the permission list;
wherein the resource includes at least one of the following:
a flow table,
a topology,
statistics and errors,
a group table,
traffic shaping,
an operating system, and
an incoming packet or an outgoing packet;
wherein the operations on the resource includes at least one of the following:
read, write, or event callback;
wherein in determining whether the operation on the resource as specified in the access request belongs to a permission list corresponding to the application program, the processor is configured to:
transform the access request into a disjunctive normal form, and transform the permission list into a conjunctive normal form; and
determine whether the disjunctive normal form belongs to the conjunctive normal form; and wherein in performing the operation on the resource as specified in the access request, the processor is configured to:
perform the operation on the resource as specified in the access request based on a determination that the disjunctive normal form belongs to the conjunctive normal form.

6. The controller according to claim 5, wherein the processor is further configured to:
obtain a permission request from a network entity running the application program; and
generate, according to the permission request, the permission list corresponding to the application program.

7. The controller according to claim 6, wherein in generating the permission list corresponding to the application program, the processor is configured to:
generate the permission list according to the permission request by using a permission filter,
wherein the permission filter comprises one or more atomic filters, and an atomic filter defines a filter expression for one attribute dimension of an application programming interface (API) calling of the controller.

8. The controller according to claim 6, wherein in generating the permission list corresponding to the application program, the processor is configured to:
- determine, according to a security constraint, whether the permission request is authorized, wherein the security constraint is used to define a range of permissions grantable by the controller; and
- generate the permission list based on a determination that the permission request is authorized.

* * * * *